(12) United States Patent
Ricci et al.

(10) Patent No.: US 12,416,584 B2
(45) Date of Patent: Sep. 16, 2025

(54) SYSTEM AND METHOD FOR SPATIALLY DETECTING ANY FOREIGN BODIES WITHIN A PRODUCT ON THE BASIS OF DIELECTRIC CHARACTERISTICS OF SAID PRODUCT

(71) Applicants: POLITECNICO DI TORINO, Turin (IT); FT SYSTEM S.R.L., Alseno (IT)

(72) Inventors: Marco Ricci, Turin (IT); Francesca Vipiana, Turin (IT); Jorge Alberto Tobon Vasquez, Turin (IT); Mario Roberto Casu, Villarbasse (IT); Giovanna Turvani, Turin (IT); Fabio Forestelli, Castelnuovo Fogliani Alseno (IT)

(73) Assignees: POLITECNICO DI TORINO, Turin (IT); FT SYSTEM S.R.L., Alseno (IT)

( * ) Notice: Subject to any disclaimer, the term of this patent is extended or adjusted under 35 U.S.C. 154(b) by 179 days.

(21) Appl. No.: 17/911,119

(22) PCT Filed: Mar. 11, 2021

(86) PCT No.: PCT/IB2021/052038
§ 371 (c)(1),
(2) Date: Jun. 5, 2023

(87) PCT Pub. No.: WO2021/181328
PCT Pub. Date: Sep. 19, 2021

(65) Prior Publication Data
US 2023/0117414 A1    Apr. 20, 2023

(30) Foreign Application Priority Data
Mar. 13, 2020  (IT) .................. 102020000005458

(51) Int. Cl.
*G01N 22/02*    (2006.01)
*H01Q 1/22*     (2006.01)
*H01Q 21/20*    (2006.01)

(52) U.S. Cl.
CPC ............ *G01N 22/02* (2013.01); *H01Q 1/22* (2013.01); *H01Q 21/20* (2013.01)

(58) Field of Classification Search
CPC ..... G01R 27/02; G01R 27/32; G01R 29/0878
See application file for complete search history.

(56) References Cited

U.S. PATENT DOCUMENTS 6,456,093 B1   9/2002  Merkel et al.
6,624,781 B1 * 9/2003  Collins ................ G01S 13/34
                                              342/179

(Continued)

FOREIGN PATENT DOCUMENTS

| CN | 110161057 A  | 8/2019  |
| DE | 43 11 103 A1 | 10/1994 |
| WO | 2011/076888 A2 | 6/2011 |

OTHER PUBLICATIONS

Bolomey J CH, et al., "On-Line Transverse Control of Materials By Means of Microwaveimaging Techniques," Materials Research Society Symposium Proceedings, vol. 189, pp. 49-53 (Jan. 1, 1991).

*Primary Examiner* — Giovanni Astacio-Oquendo
*Assistant Examiner* — Temilade S Rhodes-Vivour
(74) *Attorney, Agent, or Firm* — Maschoff Brennan

(57) ABSTRACT

Embodiments of the present disclosure relate to a system for spatially detecting foreign bodies within a product. In some embodiments, the system includes a conveyor means adapted to convey said product through a scanning region and a plurality of antennae arranged transversally to a crossing direction. In some embodiments, each antenna is adapted to transmit an electromagnetic scanning signal adapted to propagate in said scanning region, so as to diffuse (Continued)

in said product. In some embodiments, processing means are adapted to generate a first set of values indicative of dielectric characteristics of said product. Further, said processing means are adapted to compare said first set of values with a second set of values that indicate dielectric characteristics of said product in the absence of foreign bodies, wherein each antenna is adapted to transmit said electromagnetic scanning signal in a crossing time interval, according to a predefined transmission frequency.

20 Claims, 4 Drawing Sheets

(56) References Cited

U.S. PATENT DOCUMENTS

| | | | |
|---|---|---|---|
| 2003/0036674 A1* | 2/2003 | Bouton | H01Q 9/0414 600/12 |
| 2003/0178034 A1* | 9/2003 | Yuki | G01V 8/005 340/568.1 |
| 2005/0083245 A1* | 4/2005 | Yukl | H01Q 21/0025 343/909 |

* cited by examiner

SYSTEM AND METHOD FOR SPATIALLY DETECTING ANY FOREIGN BODIES WITHIN A PRODUCT ON THE BASIS OF DIELECTRIC CHARACTERISTICS OF SAID PRODUCT

The present invention relates to a system for spatially detecting any foreign bodies within a product, in accordance with the preamble of claim 1. In particular, described herein are a system and a method for spatially detecting any foreign bodies within a product on the basis of dielectric characteristics of the product itself. Such products may be, for example, liquid or solid food products, e.g. tomato sauce, jam, milk, meat, etc., contained in glass or plastic containers such as, for example, jars, bottles, vials, etc. Such products may also be cosmetic products, e.g. soap bars, or pharmaceutical products contained in suitable glass, paper or plastic containers. The invention can be used to advantage, for example, in a plant for the production of such products in order to automatically detect and/or reject any products containing foreign bodies like, for example, bone fragments, glass fragments, rubber, stones, plastic or insects, or affected by inhomogeneity due to, for example, the presence of abundant air in the product itself.

Non-invasive identification of any foreign bodies within packaged products, without contact with or alteration of the product itself, is especially useful to avoid the risk of consumer injury, while at the same time safeguarding manufacturers against legal expenses, costs to be incurred for withdrawing entire lots of products, and loss of customer confidence. Foreign bodies still represent a risk for producers because of the limitations of the methods currently in use. For example, metal detectors can only detect conductive materials, X rays cannot detect low-density plastic or small fragments of wood or glass, in addition to being harmful for the operators since they are ionizing radiations, while infrared-based techniques suffer from limited penetration and high absorption due to the presence of water in many of the products that need to be analyzed.

Unlike the technologies most commonly used, the technique of detecting/locating objects incorporated into structures by means of electromagnetic waves in the microwave range (300 MHz-300 GHz), also known as Microwave Imaging (MWI), does not discriminate according to density, but according to dielectric properties, e.g. electric permittivity, of the material that constitutes the product. This approach makes it possible to overcome the limitations of X-ray devices, since it permits the detection of low-density plastic and glass provided that there is a minimum dielectric contrast with the product contents. Measurements taken with a contrast value around 10% have proven its effectiveness. Moreover, the final cost of such a microwave device would be lower than that of X-ray systems, considering that there is no need for expensive ad-hoc sources and receivers. In fact, the components necessary for generating and capturing microwaves are readily available on the telecommunications technology market.

The thesis entitled "Microwave Imaging Technology for Food Contamination Monitoring", presented in the 2017-2018 academic year at the Polytechnic Institute of Turin by Alessandro Giordano, supervisor Prof. Francesca Vipiana (https://webthesis.biblio.polito.it/7482/), describes a microwave-based detection/location system, which allows inspecting food, in particular orange marmalade and hazelnut cream, contained in glass jars. This system consists of an array of antennae arranged around the product to be inspected. Such antennae emit a low-power electromagnetic signal at a frequency in the microwave range, which can diffuse in the product under examination so as to provide a map of the dielectric properties of such product. By analyzing such map it is then possible to identify any foreign bodies within the product.

The above-mentioned MWI system, which is known in the art, suffers from a number of drawbacks, which will be illustrated below.

A first drawback is related to the fact that the map of the dielectric properties of the product is a two-dimensional one, and therefore such a system does not allow for a non-invasive inspection of product in its entirety, i.e. the above-mentioned system cannot provide a three-dimensional map of the dielectric properties of the product; this results in a poorly efficient non-invasive inspection system.

Another drawback lies in the fact that the two-dimensional map of the dielectric properties of a product can only identify the material of the foreign body, locating the latter in a two-dimensional section of the product. However, such a two-dimensional map of the dielectric properties of a product cannot determine the dimensions of the foreign body, nor its exact position within the product. This results in the impossibility of making an effective subsequent statistical analysis for reducing, or eliminating, the causes of the presence of foreign bodies in the products manufactured along a production line.

A further drawback is related to the fact that the above-mentioned MWI system cannot be easily installed in an industrial production line.

It is therefore one object of the present invention to solve these and other problems suffered by the prior art, in particular by providing a system and a method for spatially detecting any foreign bodies within a product on the basis of dielectric characteristics of the product itself, which makes it possible to inspect the product in its entirety in a non-invasive manner by determining a three-dimensional map of the dielectric properties of said product.

It is another object of the present invention to provide a system and a method for spatially detecting any foreign bodies within a product on the basis of dielectric characteristics of the product itself, which makes it possible to make an effective a posteriori statistical analysis for reducing, or completely eliminating, the causes of the presence of foreign bodies in the products manufactured along a production line.

It is a further object of the present invention to provide a system and a method for spatially detecting in real time any foreign bodies within a product being manufactured along an industrial production line on the basis of dielectric characteristics of the product itself.

The invention described herein consists of a system and a method for spatially detecting any foreign bodies within a product on the basis of dielectric characteristics of the product itself by determining in real time the dielectric contrast between the product contents and any foreign bodies.

Further advantageous features of the present invention are set out in the appended claims, which are an integral part of the present description.

The invention will now be described in detail through some non-limiting exemplary embodiments thereof, with particular reference to the annexed drawings, wherein:

FIG. 1 schematically shows an example of a system for spatially detecting any foreign bodies within a product in accordance with an embodiment of the present invention;

Figure 1:
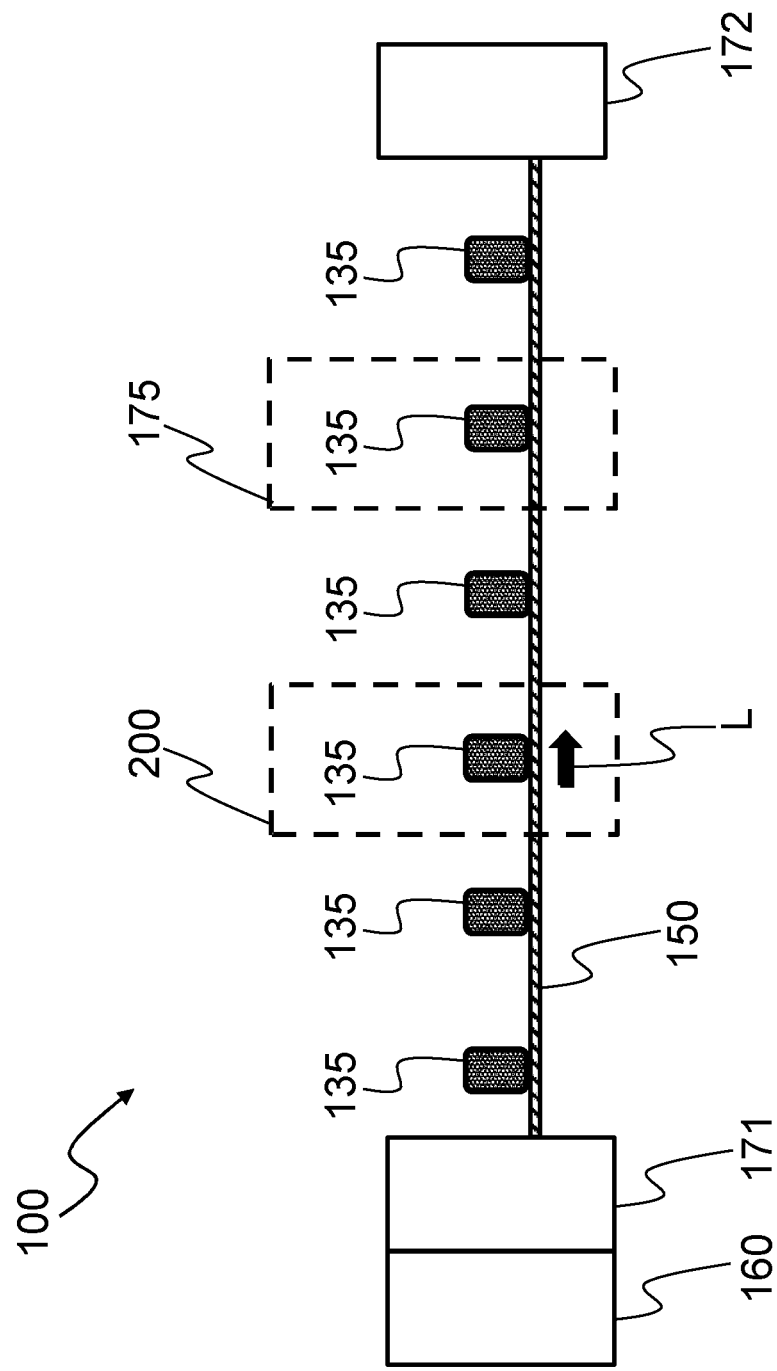

With reference to FIG. 1, there is schematically shown a system 100 for spatially detecting any foreign bodies within one or more products 135 having a substantially cylindrical or parallelepiped shape, such as, for example, vials, flacons, bottles or jars made of glass, paper, plastic or other suitable materials, containing food, cosmetic, pharmaceutical or chemical products. Said system 100 comprises, for example, a production unit 160, a first storage unit 171, a second storage unit 172, conveyor means 150, at least one plurality of antennae 200 adapted to operate in the microwave range, and a rejection unit 175 for rejecting at least one product 135 comprising one or more foreign bodies.

The production unit 160 is adapted to produce at least one product 135, such as, for example, a glass jar containing jam. The production unit 160 may comprise actuator means adapted to carry out production processes such as, for example, washing and filling glass containers, so as to create the product 135. During these production processes, foreign bodies like, for example, glass fragments generated, for example, by erroneously destroyed containers, may be dangerously included in at least one product 135. The production unit 160 may comprise actuator means for moving out at least one product 135; the actuator means may comprise servomechanisms driven by electric motors and/or hydraulic systems.

The first storage unit 171 is adapted to store at least one product 135 that has not yet been inspected in accordance with the present invention, i.e. a product 135 for which it cannot be excluded apriori that it does not contain at least one foreign body. The first storage unit 171 and said production unit 160 may be operatively connected in a manner such that at least one product 135 can be moved from the production unit 160 to the first storage unit 171. The first storage unit 171 may comprise actuator means for moving out at least one product 135; the actuator means may comprise servomechanisms driven by electric motors and/or hydraulic systems.

The second storage unit 172 is adapted to store at least one product 135 that has been inspected in accordance with the present invention. The second storage unit 172 may comprise actuator means for moving in at least one product 135 for which the absence of any foreign bodies has been verified; the actuator means may comprise servomechanisms driven by electric motors and/or hydraulic systems.

The conveyor means 150 are adapted to convey said product 135 through a scanning region S (visible in FIG. 2) along a crossing direction L, in a predefined crossing time interval T for crossing said scanning region S. For example, the conveyor means 150 may convey at least one product 135 to be inspected from the first storage unit 171 to the second storage unit 172, moving said product 135 at a constant speed in the order of 0.5 m/s. The conveyor means 150 may be operatively connected to the first storage unit 171 and the second storage unit 172, and may comprise, for example, belts, chains, etc., e.g. made of rubber and/or metal. The conveyor means 150 may comprise servomechanisms driven by electric motors and/or hydraulic systems.

Figure 2:
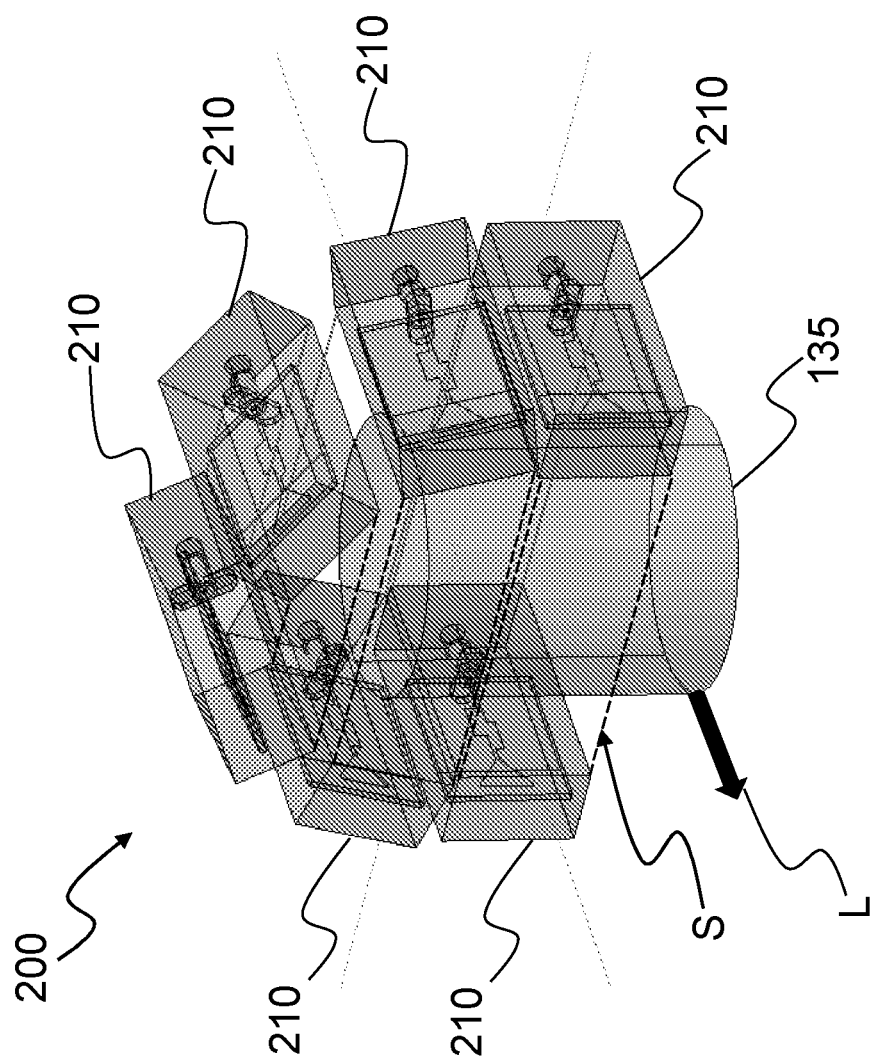
FIG. 2 shows an illustrative structural diagram of an array of antennae used in the system of FIG. 1.

The plurality of antennae 200, which will be described in detail with reference to FIG. 2, are arranged transversally to the crossing direction L of the scanning region S. Each antenna 210 of the plurality of antennae 200 is adapted to operate in the microwave range and is adapted to transmit an electromagnetic scanning signal adapted to propagate in the scanning region S, so as to diffuse in said product 135 passing through the scanning region S. In one embodiment of the invention, the antennae 210 of said plurality of antennae 200 may be all equal. The plurality of antennae 200 may be operatively connected to the conveyor means 150, e.g. so as to cause at least one product 135 to be inspected to move from the first storage unit 171 to the second storage unit 172.

The rejection unit 175 is adapted to reject at least one product 135, containing one or more foreign bodies, in motion along the conveyor means 150. The rejection unit 175 is located downstream of said plurality of antennae 200 and possibly upstream of the second storage unit 172. The rejection unit 175 may comprise signalling means for indicating the detection of at least one foreign body in the product 135, such as, for example, audible and/or visual signalling devices, actuator means for conveying to a discharge zone, not shown in FIG. 1, at least one product 135 for which the presence of at least one foreign body has been verified; the actuator means may comprise servomechanisms driven by electric motors and/or hydraulic systems.

Nevertheless, the production unit 160 may even not be included in said system 100: this is the case when the products 135 contained in the first storage unit 171 have been manufactured in a different location, other than the one where the system 100 described herein is being used.

FIG. 2 shows an illustrative structural diagram of the plurality of antennae 200, also referred to as antenna array, used in the system 100 of FIG. 1. Each antenna 210 of the plurality of antennae 200 is adapted to transmit or receive at least one electromagnetic signal in the electromagnetic spectrum range from 300 MHz to 300 GHz, i.e. each antenna 210 of the plurality of antennae 200 is adapted to operate in the microwave range.

The plurality of antennae 200 are arranged transversally to the crossing direction L of the scanning region S, and comprise at least three antennae 210 adapted to surround, at least partially, the product 135, said at least three antennae 210 being disposed in a manner such that the product 135 can be moved along the crossing direction L, driven by the drive means 150, e.g. at a speed of 0.5 m/s.

In one embodiment of the invention, the antennae 210 of the plurality of antennae 200 may be so arranged as to form an arc, or a circumference, in a plane transversal to the crossing direction L. In this embodiment of the invention, the scanning region S may be defined as a spatial region centred in said arc, or said circumference, formed by the arrangement of said antennae 210, having an extension along the crossing direction L which is equal to a first dimension of the product 135, along the crossing direction L, added to a first guard length, said spatial region having an extension along the direction perpendicular to the crossing direction L which is equal to a second dimension of the product 135, along the direction perpendicular to the crossing direction L, added to a second guard length, the height of said spatial region being delimited by the arc, or circumference, formed by the arrangement of said antennae 210. For example, assuming that the product 135 has a cylindrical shape with a diameter of 8 cm, both the first dimension and the second dimension of the product 135 will match the diameter, i.e. 8 cm. The first guard length and the second guard length can both be defined as two fractions of the first dimension and of the second dimension of the product 135, e.g. ½ and ¼, respectively. Consequently, the scanning region S will be defined by the spatial part of 12 cm×10 cm, with a height delimited by the arc, or circumference, formed by the arrangement of said antennae 210. In another embodiment of the invention, the antennae 210 of the plurality of antennae 200 may be arranged in such a way as to form a broken line, or a rectangular or trapezoidal perimeter, in the plane transversal to the crossing direction L. To this end, in both of these embodiments of the invention the antennae 210 may be housed in a supporting structure. Such structure may be anchored to lateral supports mounted on the conveyor means 150. In both of the above-mentioned embodiments of the invention, the transversal plane may be substantially perpendicular to the crossing direction L.

In another embodiment of the invention, the scanning region S may be defined by the overlap of radiation diagrams of each antenna 210 of said plurality of antennae 200, so that the power irradiated in the scanning region S by each antenna 210 of said plurality of antennae 200 will exceed a predefined power value. For example, as shown in FIG. 2, in one embodiment of the invention the scanning region S may be defined by the spatial part comprised between the antennae 210 of the plurality of antennae 200, and delimited by the dimensions of the antennae 210 themselves, wherein the power irradiated by each antenna 210 of said plurality of antennae 200 exceeds a predefined power value.

Each antenna 210 of the plurality of antennae 200 is adapted to operate in the microwave range. Each antenna 210 is adapted to transmit the electromagnetic scanning signal, which propagates in the scanning region S and diffuses in the product 135, i.e. the electromagnetic scanning signal diffuses in at least one portion of the product 135.

In particular, the product 135 is adapted to pass through the scanning region S, crossing it completely in a predefined crossing time interval T. The crossing time interval T may depend on the speed of motion of the product 135 being conveyed by the conveyor means 150 and on the dimensions of the scanning region S. As the product 135 passes through said scanning region S, in the crossing time interval T, each antenna 210 of the plurality of antennae 200 is adapted to transmit, at least once, the electromagnetic scanning signal according to a predefined transmission sequence. The electromagnetic scanning signal sequentially transmitted by each antenna 210 diffuses in the product 135, i.e. it diffuses in at least one portion thereof. Consequently, at least one diffused electromagnetic signal is received by the remaining antennae 210, which are not transmitting. With a set of diffused electromagnetic signals it is possible to determine a three-dimensional map of the dielectric properties of the product 135. The frequency and power of the electromagnetic scanning signal depend on the size and dielectric characteristics of the contents of the product 135 to be analyzed; the conductivity of the material contained in the product 135 is particularly important to ensure a sufficient penetration of the electromagnetic scanning signal into the product 135.

The sequence of transmission by the plurality of antennae 200 may be defined, for example, as a progressive transmission based on a predefined order of the antennae 210 of the plurality of antennae 200. For example, assuming that the antennae 210 are arranged along a line, the transmission sequence may start from a first antenna located at one end of said line and may finish at a last antenna located at another end of said line. In other embodiments of the invention, other scanning sequences may be considered on the basis of the geometry of the product 135 and/or the geometry of the scanning region S.

Figure 3:
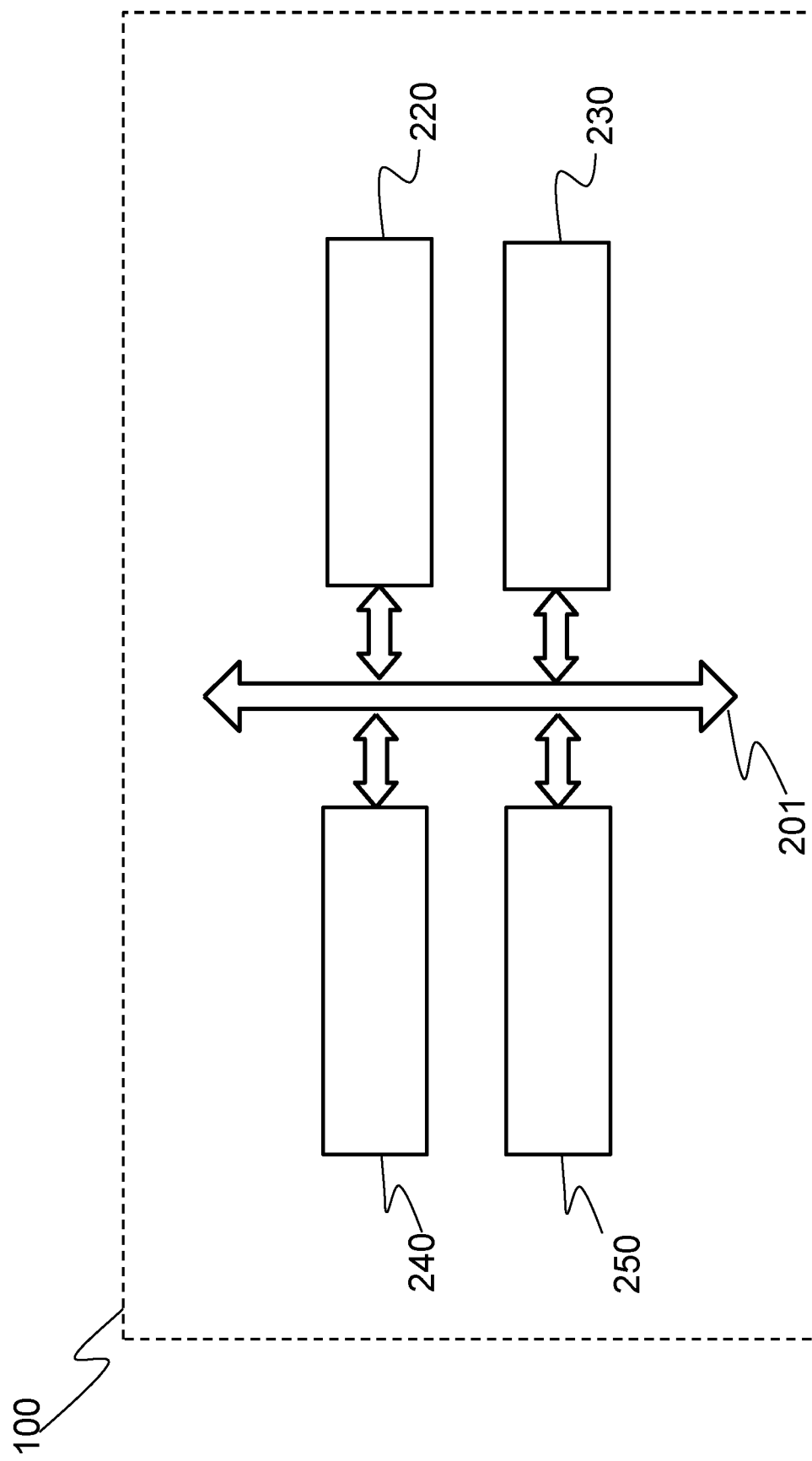
FIG. 3 shows an illustrative block diagram of the system of FIG. 1.

FIG. 3 shows an illustrative block diagram of the system 100 of FIG. 1. Said system 100 may comprise interfacing means 220, communication means 230, memory means 240 and processing means 250, which may be operatively interconnected via a communication bus 201.

The interfacing means 220 are adapted to manage the plurality of antennae 200. The interfacing means 220 may comprise, for example, devices adapted to transmit and receive electromagnetic signals in the microwave range and respective control units and/or servomechanisms, driven by electric motors, adapted to spatially orient the antennae 210 of the plurality of antennae 200 so as to optimize the transmission and reception of the electromagnetic signals in the scanning region S. The interfacing means 220 may comprise, for example, sensor means such as photocells, RFID sensors, video cameras, and so forth, for detecting the presence of the product 135 at the entrance of the scanning region S.

The communication means 230 are adapted to output from the system 100 information obtained by means of the method for spatially detecting any foreign bodies within a product 135, which is the subject of the present invention, as will be described below by way of example with reference to the flow chart of FIG. 4. The communication means 230 may comprise, for example, a communication unit adapted to communicate with a remote management system and/or server. Said communication unit may comprise, for example, an ETHERNET interface, a WiFi interface, a GSM, UMTS, LTE interface, etc. The communication unit may establish a connection with an external apparatus for managing or monitoring the system 100, such as, for example, a computer, a smartphone, a tablet, etc. The communication means 230 may allow a user to interact with the system 100. For example, the communication means 230 may comprise output and input means, e.g. a display and an alphanumerical keyboard, respectively, or, alternatively, a touchscreen display displaying an alphanumerical keyboard and interactive symbols. In another embodiment of the invention, the communication means 230 may comprise a communication port, such as, for example, an RS232 or USB interface, etc., to be connected to a terminal external to the system 100. The terminal external to the system 100 may be, for example, a smartphone controlled by a user or an operator.

The memory means 240 permit storing information inputted to and/or outputted from the system 100 and instructions implementing the present embodiment of the invention; the memory means 240 may comprise, for example, a flash-type solid-state memory. The information may include a set of values and/or parameters useful for implementing the method for spatially detecting any foreign bodies within a product 135, which is the subject of the present invention, such as, for example, the operational state of the plurality of antennae 200 and/or values of several physical quantities, e.g. speed of the product 135 through the scanning region S, frequency and power of the electromagnetic scanning signal, and so forth. The instructions stored in the memory means 240 will be described in detail below with reference to the flow chart of FIG. 4.

The processing means 250 allow processing the information and the instructions stored in the memory means 240 and/or received via said interfacing means 220 and communication means 230, and may comprise, for example, an ARM processor, an Arduino microcontroller, a processor with x86 or x64 architecture, etc.

Figure 4:
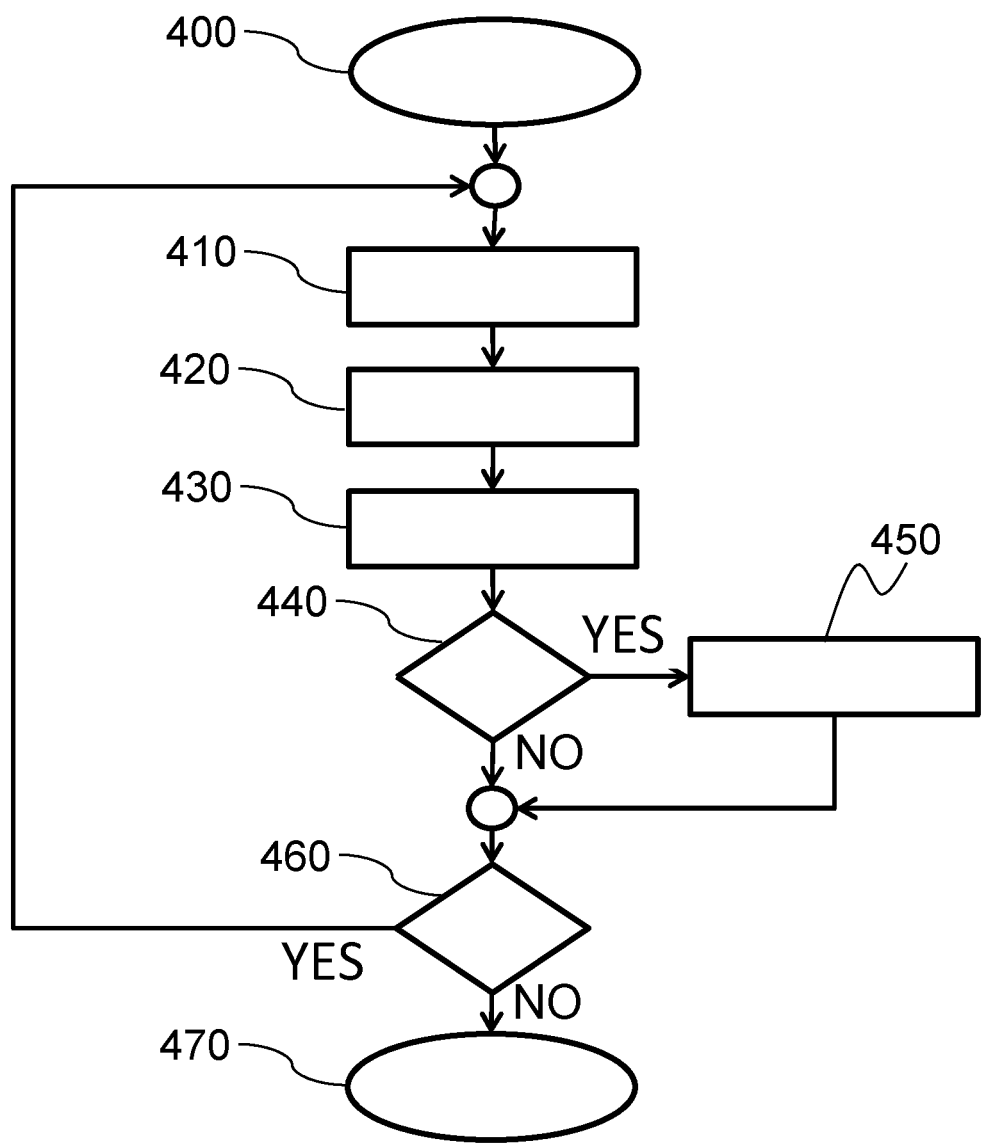
FIG. 4 shows an illustrative flow chart of a method for spatially detecting any foreign bodies within a product, with reference to the system of FIG. 1.

With reference to FIG. 4, the following will describe an exemplary method for spatially detecting any foreign bodies within a product 135 with reference to the system 100 of FIG. 1.

At step 400, a phase of initializing the system 100 is carried out in order to put the latter in operation. During this step, for example, the processing means 250 verify the operational state of the elements of the system 100, such as, for example, said production units 160, first storage unit 171, second storage unit 172, conveyor means 150, plurality of antennae 200, rejection unit 175, interfacing means 220, communication means 230, memory means 240, etc.

At step 410, the processing means 250 are configured for executing a conveyance phase. During this phase, the processing means 250 control the conveyor means 150 that convey the product 135 through the scanning region S along the crossing direction L, in the predefined crossing time interval T. The crossing time interval T for crossing the scanning region S may depend on the speed of motion of the product 135 and on the dimensions of the scanning region S. The speed of motion of the product 135 may be, for example, a substantially constant speed in the order of 0.5 m/s. During this phase, the processing means 250 may receive, from the sensor means of the interface unit 220, information indicating the presence of the product 135 at the entrance of the scanning region S. The processing means 250 can then initialize a timer TM for counting the crossing time interval T necessary for the product 135 to cross the scanning region S.

At step 420, the processing means 250 are configured for executing a scanning phase. During this phase, the processing means 250 control the interfacing means 220 in such a way that the electromagnetic scanning signal, in the microwave range, is transmitted by each antenna 210 of the plurality of antennae 200, the plurality of antennae 200 being arranged transversally to the crossing direction L. In this manner, the electromagnetic scanning signal propagates in the scanning region S so as to diffuse in said product 135, i.e. the electromagnetic scanning signal diffuses in at least one portion of the product 135. During said scanning phase, each antenna 210 of the plurality of antennae 200 transmits the electromagnetic scanning signal at least once within the crossing time interval T, according to the predefined transmission sequence.

For example, the product 135 being conveyed by the conveyor means 150 and entering the scanning region S triggers the timer TM for counting the crossing time interval T necessary for the product 135 to cross the scanning region S. As the product 135 passes through said scanning region S, each antenna 210 of the plurality of antennae 200 is adapted to transmit the electromagnetic scanning signal at least once according to a predefined transmission sequence. The transmission sequence stops when the timer TM reaches the value of the crossing time interval T, which has been determined on the basis of the speed of motion of the product 135 and of the dimensions of the scanning region S, so that the product 135 can be entirely scanned within the crossing time interval T.

The transmission sequence is defined a priori, e.g. based on the geometry of the product 135 and/or the geometry of the scanning region S. For example, with reference to FIG. 2, assuming that the plurality of antennae 200 comprises six antennae 210 orderly arranged from left to right relative to the crossing direction L, the transmission sequence during the crossing time interval T necessary for the product 135 to cross the scanning region S may be:

(1, 2, 3, 4, 5, 6, 6, 5, 4, 3, 2, 1, 1, 2, 3, 4, 5, 6, 6, 5, 4, 3, 2, 1).

Each antenna 210 of the plurality of antennae 200, numbered from "1" to "6", sequentially transmits the scanning signal for a transmission time interval t shorter than the crossing time interval T; for example, the transmission time interval t for each antenna 210 may be defined to be shorter than or equal to the crossing time interval T divided by the number of elements in the transmission sequence, which in this example are 24. The transmission time interval t may be in the order of, for example, 10 ms. The electromagnetic scanning signal sequentially transmitted by each antenna 210, starting from the first antenna "1" up to the last antenna "6", diffuses in the product 135, i.e. it diffuses in at least one portion thereof. Consequently, at least one diffused electromagnetic signal is received by the remaining non-transmitting antennae 210, e.g. "2" to "6" if the first antenna "1" is the transmitting one. The frequency and power of the electromagnetic scanning signal depend on the size and dielectric characteristics of the contents of the product 135 to be analyzed; the conductivity of the material contained in the product 135 is particularly important to ensure a sufficient penetration of the electromagnetic scanning signal in the product 135. In other embodiments of the invention, other scanning sequences may be considered, such as, for example:

(1, 2, 3, 4, 5, 6, 1, 2, 3, 4, 5, 6, 1, 2, 3, 4, 5, 6, 1, 2, 3, 4, 5, 6), (6, 5, 4, 2, 1, 6, 5, 4, 2, 1, 6, 5, 4, 2, 1, 6, 5, 4, 2, 1, 6, 5, 4, 2, 1), and so forth.

At step 430, the processing means 250 are configured for executing an analysis phase. During this phase, the processing means 250 generate a first set of values indicative of the dielectric characteristics of the product 135 based on at least one diffused electromagnetic signal received by at least one antenna 210 of the plurality of antennae 200. During this phase, the processing means 250 compare said first set of values with a second set of values indicative of the dielectric characteristics of said product 135 in the absence of any foreign bodies.

Assuming, for example, that the plurality of antennae 200 comprises a number N of antennae 210, the first set of values can be determined by means of each electromagnetic signal diffused by the scanned product 135, each diffused electromagnetic signal being received by each antenna 210 of the plurality of antennae 200. Excluding the self-interaction terms, which is the case when the transmitting antenna and the receiving antenna coincide, it is possible to determine, among all possible pairs of antennae 210, a first interaction matrix comprising $N^2-N$ interactions expressed as both the phase and the amplitude of such received electromagnetic signals, e.g. by means of complex numbers. The first interaction matrix represents the first set of values indicative of the dielectric characteristics of said product 135. Likewise, the second set of values can be determined by means of each electromagnetic signal diffused by the product 135 in the absence of any foreign bodies, each diffused electromagnetic signal being received by each antenna 210 of the plurality of antennae 200. Excluding the self-interaction terms, it is possible to determine, among all possible pairs of antennae 210, a second interaction matrix comprising $N^2-N$ interactions expressed as both the phase and the amplitude of such received electromagnetic signals, e.g. by means of complex numbers. The second interaction matrix represents the second set of values indicative of the dielectric characteristics of said product 135 in the absence of any foreign bodies. The second set of values may be predetermined during the initialization phase described at step 400, and stored by said processing means 250 into the memory means. Likewise, during the analysis phase described herein, the first set of values may be stored by said processing means 250 into the memory means 240.

The processing means 250 compare the first set of values and the second set of values, e.g. by difference between the first interaction matrix and the second interaction matrix, thereby obtaining a differential interaction matrix indicative of the dielectric characteristics of one or more foreign bodies that may be present in the scanned product. Likewise, the differential interaction matrix may also be stored by said processing means 250 into the memory means 240.

The processing means 250 can decompose the differential interaction matrix into eigenvectors by using an algorithm based on truncated singular value decomposition, known from the previously mentioned document. This transform makes it possible to filter the useful information, cancelling a noise component that can be recognized through the application of said algorithm. By using the Born approximation, one can consider as approximately equivalent the incident electromagnetic scanning signal and the total electromagnetic field in the scanning region S; based on this consideration, the measured electromagnetic field variation, i.e. the differential interaction matrix, can be assumed to be linearly dependent on the variation of the dielectric properties within the volume of the product 135, which may be caused by the presence of at least one foreign body. This makes it possible to determine, from the differential interaction matrix, a three-dimensional map of the dielectric properties of the volume of the product 135 under examination, thereby building a three-dimensional tomography of the scanned product 135.

At step 440, the processing means 250 verify if the product 135 internally contains at least one foreign body. To this end, for example, the processing means 250 may check if all the values of the differential interaction matrix are not null. If that is the case, the processing means 250 will execute step 450, otherwise they will execute step 460.

At step 450, the processing means 250 output signalling information via said communication means 230. For example, the signalling information may be displayed on a screen, so that an operator can monitor in real time the presence of one or more foreign bodies in one or more products 135. Such signalling information may trigger actuator means of the rejection unit 175, so as to reject those products 135 which contain at least one foreign body. For example, the products 135 may be rejected by means of a pneumatic cylinder that will cause the rejected products 135 to fall into a collection compartment. Such signalling information may be sent to a management system of the system 100, even a remote one, e.g. via Wi-Fi, GSM, ETHERNET, etc. communication interfaces. The processing means 250 may store the values of the differential interaction matrix into the memory means 240, so as to collect information about the dimensions, position and type of the foreign body detected in one or more products 135. This is useful to analyze the causes of the presence of one or more foreign bodies in one or more products 135. Subsequently, the processing means 250 will execute step 460.

At step 460, the processing means 250 check, e.g. by means of sensors like video cameras, photocells, etc., if there are any other products 135 that need to be scanned. If so, the processing means will execute step 410, otherwise they will execute step 470.

At step 470, the processing means 250 execute all the operations necessary for completing the operations of the system 100. During this step, the processing means 250 may signal the inoperative state of the system 100, e.g. by means of visual indicators, e.g. LED indicator lights, and or audible indicators, e.g. buzzers or loudspeakers.

The advantages of the present invention are apparent from the above description.

The system and method for spatially detecting any foreign bodies within a product, which is the subject of the present invention, advantageously allows for a non-invasive inspection of the product in its entirety, determining a three-dimensional map of the dielectric properties of such product.

Another advantage of the present invention lies in the fact that any foreign bodies within a product are detected on the basis of dielectric characteristics of the product itself, making it possible to collect information such as: dimensions, position and type of the foreign bodies contained in the product, so that an effective analysis can be made for reducing, or completely eliminating, the causes of the presence of foreign bodies in the products manufactured along a production line.

A further advantage of the present invention lies in the fact that it provides a system and a method that make it possible to spatially detect, in real time, any foreign bodies within a product on the basis of dielectric characteristics of the product itself by appropriately configuring the number of antennae of the plurality of antennae and the sequence of transmission of the electromagnetic scanning signals of the antennae.

Of course, without prejudice to the principle of the present invention, the forms of embodiment and the implementation details may be extensively varied from those described and illustrated herein merely by way of non-limiting example, without however departing from the protection scope of the present invention as set out in the appended claims.

The invention claimed is:

1. A system for spatially detecting any foreign bodies within a product on the basis of dielectric characteristics of said product, said system comprising:
   conveyor means adapted to convey said product through a scanning region along a crossing direction, in a predefined crossing time interval for crossing said scanning region;
   a plurality of antennae arranged transversally to said crossing direction and comprising a number N of antenna, wherein each antenna of said plurality of antennae is adapted to operate in the microwave range, and wherein each antenna is adapted to transmit an electromagnetic scanning signal adapted to propagate in said scanning region, so as to diffuse in said product; and
   processing means adapted to generate a first set of values indicative of the dielectric characteristics of said product based on at least one diffused electromagnetic signal received by at least one antenna of said plurality of antennae,
   wherein:
   said processing means being adapted to compare said first set of values with a second set of values indicative of the dielectric characteristics of said product in the absence of any foreign bodies,
   each antenna of said plurality of antennae is adapted to transmit said electromagnetic scanning signal at least once in said crossing time interval, according to a predefined transmission sequence,
   the first set of values is determined by means of said electromagnetic signal diffused by said scanned product, each electromagnetic signal being received by each antenna of said plurality of antennae excluding the self-interaction terms, namely when the transmitting antenna and the receiving antenna coincide, to determine, among all possible pairs of antennae, a first interaction matrix comprising $N^2$—$N$ first interaction values expressed as both the phase and the amplitude of said at least one diffused electromagnetic signal;

the second set of values is determined by means of said electromagnetic signal diffused by said scanned product in the absence of any foreign bodies, each electromagnetic signal being received by each antenna of said plurality of antennae excluding the self-interaction terms, namely when the transmitting antenna and the receiving antenna coincide, to determine, among all possible pairs of antennae, a second interaction matrix comprising $N^2$—$N$ second interaction values expressed as both the phase and the amplitude of said at least one diffused electromagnetic signal; and said processing means are adapted to compare said first set of values and said second set of values by difference between the first interaction matrix and the second interaction matrix, thereby obtaining a differential interaction matrix indicative of the dielectric characteristics of one or more foreign bodies that may be present in the scanned product.

2. The system according to claim 1, wherein said plurality of antennae comprises at least three antennae adapted to surround, at least partially, said product.

3. The system according to claim 1, wherein the antennae of said plurality of antennae are so arranged as to form an arc, or a circumference, in a plane transversal to said crossing direction.

4. The system according to claim 3, wherein:
the scanning region includes a spatial region centred in said arc, or said circumference, formed by the arrangement of said antennae, having an extension along the crossing direction which is equal to a first dimension of the product, along the crossing direction, added to a first guard length, and
the spatial region has an extension along the direction perpendicular to the crossing direction which is equal to a second dimension of the product, along the direction perpendicular to the crossing direction, added to a second guard length, the height of said spatial region being delimited by the arc, or circumference, formed by the arrangement of said antennae.

5. The system according to claim 1, wherein the frequency and power of said electromagnetic scanning signal depends on size, dielectric characteristics, and electric conductivity of the contents of said product.

6. The system according to claim 1, wherein said transmission sequence of said plurality of antennae is defined as a progressive transmission according to a predefined order of the antennae of said plurality of antennae.

7. The system according to claim 1, wherein said crossing time interval is determined on the basis of a speed of motion of the product and of the dimensions of the scanning region, so that the product can be entirely scanned within the crossing time interval.

8. The system according to claim 1, wherein each antenna of said plurality of antennae is adapted to transmit or receive at least one electromagnetic signal in the electromagnetic spectrum band between 300 MHz and 300 GHz.

9. The system according to claim 1, further comprising memory means adapted to store said first set of values and/or second set of values.

10. A method for spatially detecting foreign bodies within a product on the basis of dielectric characteristics of said product, said method comprising:

a conveyance phase, wherein conveyor means convey said product through a scanning region along a crossing direction, in a predefined crossing time interval for crossing said region;

a scanning phase, wherein an electromagnetic scanning signal, in the microwave range, is transmitted by each antenna of a plurality of antennae arranged transversally to said crossing direction, wherein said plurality of antenna comprises a number N of antenna, and wherein said electromagnetic scanning signal propagates in said scanning region, so as to diffuse in said product;

an analysis phase, wherein processing means:
generate a first set of values indicative of the dielectric characteristics of said product based on at least one diffused electromagnetic signal received by at least one antenna of said plurality of antennae, and
compare said first set of values with a second set of values indicative of the dielectric characteristics of said product in the absence of any foreign bodies wherein:
during said scanning phase, each antenna of said plurality of antennae transmits said electromagnetic scanning signal at least once in said crossing time interval, according to a predefined transmission sequence,
during said analysis phase the first set of values is determined by means of said electromagnetic signal diffused by said scanned product, each electromagnetic signal being received by each antenna of said plurality of antennae excluding the self-interaction terms, namely when the transmitting antenna and the receiving antenna coincide, to determine, among all possible pairs of antennae, a first interaction matrix comprising $N^2$—$N$ first interaction values expressed as both the phase and the amplitude of said at least one diffused electromagnetic signal;
the second set of values is determined by means of said electromagnetic signal diffused by said scanned product in the absence of any foreign bodies, each electromagnetic signal being received by each antenna of said plurality of antennae excluding the self-interaction terms, namely when the transmitting antenna and the receiving antenna coincide, to determine, among all possible pairs of antennae, a second interaction matrix comprising $N^2$—$N$ second interaction values expressed as both the phase and the amplitude of said at least one diffused electromagnetic signal; and
said processing means are adapted to compare said first set of values and said second set of values by difference between the first interaction matrix and the second interaction matrix, thereby obtaining a differential interaction matrix indicative of the dielectric characteristics of one or more foreign bodies that may be present in the scanned product.

11. The method according to claim 10, wherein said plurality of antennae comprises at least three antennae that surround, at least partially, said product.

12. The method according to claim 11, wherein the antennae of said plurality of antennae are so arranged as to form an arc, or a circumference, in a plane transversal to said crossing direction.

13. The method according to claim 11, wherein the frequency and power of said electromagnetic scanning signal are defined by size, dielectric characteristics, and electric conductivity of the contents of said product.

14. The method according to claim 10, wherein the antennae of said plurality of antennae are so arranged as to form an arc, or a circumference, in a plane transversal to said crossing direction.

15. The method according to claim 14, wherein:
- the scanning region is defined as a spatial region centred in said arc, or said circumference, formed by the arrangement of said antennae, having an extension along the crossing direction which is equal to a first dimension of the product, along the crossing direction, added to a first guard length, and
- the spatial region has an extension along the direction perpendicular to the crossing direction which is equal to a second dimension of the product, along the direction perpendicular to the crossing direction, added to a second guard length, the height of said spatial region being delimited by the arc, or circumference, formed by the arrangement of said antennae.

16. The method according to claim 10, wherein the frequency and power of said electromagnetic scanning signal is defined by size, dielectric characteristics, and electric conductivity of the contents of said product.

17. The method according to claim 10, wherein said transmission sequence of said plurality of antennae is defined as a progressive transmission according to a predefined order of the antennae of said plurality of antennae.

18. The method according to claim 10, wherein said crossing time interval is defined on the basis of a speed of motion of the product and of the dimensions of the scanning region, so that the product can be entirely scanned within the crossing time interval.

19. The method according to claim 10, wherein each antenna of said plurality of antennae transmits or receives at least one electromagnetic signal in the electromagnetic spectrum band between 300 MHz and 300 GHz.

20. The method according to claim 10, comprising a storage phase wherein said processing means store said first set of values and/or second set of values into memory means.

* * * * *